June 1, 1948. W. O. DAVIS 2,442,722
TRANSMISSION FOR MEASURING INSTRUMENTS
Filed Dec. 13, 1943
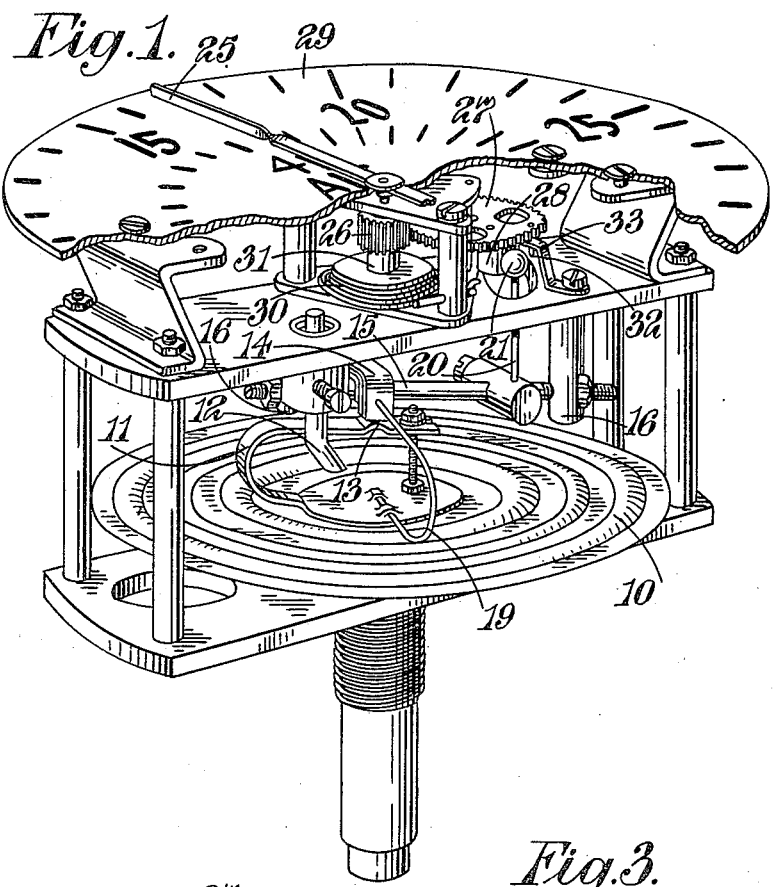
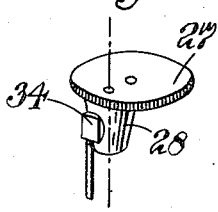
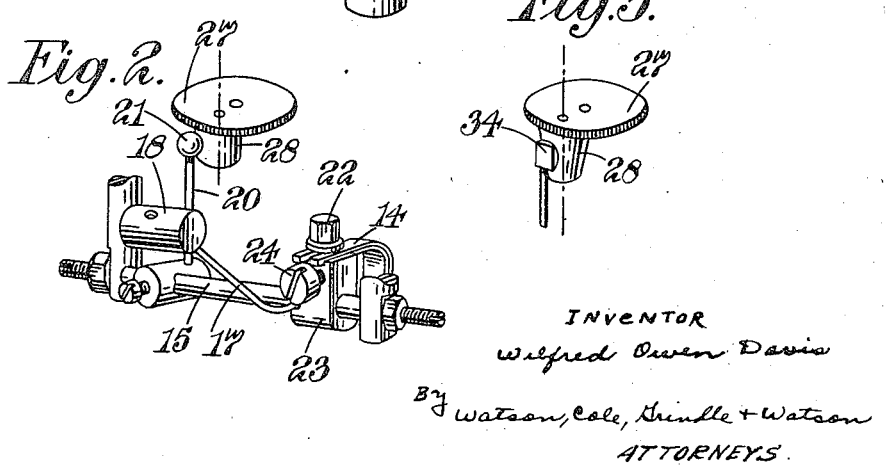
INVENTOR
Wilfred Owen Davis
By Watson, Cole, Grindle & Watson
ATTORNEYS.

Patented June 1, 1948

2,442,722

UNITED STATES PATENT OFFICE 2,442,722

TRANSMISSION FOR MEASURING INSTRUMENTS

Wilfred Owen Davis, London, England, assignor to S. Smith & Sons (England) Limited, a company of Great Britain Application December 13, 1943, Serial No. 514,121 In Great Britain October 14, 1942

7 Claims. (Cl. 73—182)

1

This invention relates to transmissions in measuring instruments, such as air speed indicators, of the kind in which the responsive element of the instrument does not move uniformly for uniform changes in the condition being recorded or indicated, and has for an object to provide a transmission which will enable a substantially even scale to be associated with the pointer. For example, in the case of an air speed indicator in which a capsule is subjected internally to dynamic air pressure and externally to static air pressure, a given change of air speed at the lower ranges of speed usually results in a smaller movement of the diaphragm than for the same extent of change at higher speed, and thus if a transmission for a rotating pointer operates at a constant speed ratio the graduations of the scale associated with the pointer must be more closely spaced at the low speed end, and this closing of the scale is particularly noticeable in the case of instruments covering a large range of speeds. A transmission according to this invention obviates the necessity of unevenly spaced scale.

According to this invention, a transmission in a measuring instrument comprises a rotating element operating a pointer, a driven member mounted on said rotating element at a distance from its axis of rotation, a driving member engaging said driven member and adapted to be moved by a responsive element of the instrument in a direction transverse to the circumferential path of movement of the driven member, one or both of which members is mounted to rotate bodily and the contacting faces of which members are so shaped and the direction of movement of the driving member so selected that the required varying speed ratio between the members is effected over the required range of movement. It will be appreciated that the action of the driving and driven members is somewhat similar to that of a toggle joint.

The operative face of one of said members may be a surface of revolution and that member is mounted to rotate bodily, whereas the contour of the operative face of the other member may be circular or non-circular and that member is fixed against bodily rotation. Alternatively, the operative faces of both members may be surfaces of revolution and both may be mounted for bodily rotation. With these arrangements, the required movement may be transmitted from the driving member to the driven member at the required varying speed ratio without sliding friction between these members, whereby the sensitivity of the instrument is enhanced.

2

The aforesaid transmission may be arranged to convert rectilineal movement of the responsive member of the instrument into arcuate or rotary movement of the driving member in a plane substantially at right-angles to the plane of circumferential movement of the driven member, which driven member for this reason requires to have sufficient axial length to accommodate the arcuate movement of the driving member.

The contour of the driven member may be uniform along the axis thereof; for example, the member may be cylindrical, or may vary along the axis; for example, it may be conical in shape. It will be appreciated, however, that the uniformity or variation of the contour along the axis of the driven member will depend on the changes in speed ratio required and the shape of the operative face of the driving member.

It is found for an air speed indicator for an aircraft suitable for registering air speed of over four-hundred miles an hour, that a suitable shape for the operative face of the driving member is spherical and a suitable shape for the driven member is cylindrical.

The following is a description of one form of transmission according to this invention suitable for an air speed indicator, reference being made to the accompanying drawing, in which:

Figure 1 is a perspective view of the instrument with a part of the scale cut away;

Figure 2 is a perspective view of part of the transmission viewed from the opposite direction to Figure 1, and Figure 3 shows an alternative form of driving and driven members of the transmission.

The responsive element of the indicator comprises a disc-like corrugated capsule 10 which, as indicated above, is subjected internally to dynamic air pressure and externally to static pressure. Secured to the centre of the capsule is a comparatively rigid U-shaped member 11, the plane of the U being at right-angles to and diametrically disposed in relation to the capsule. Overloading of the diaphragm is prevented by an adjustable stop 12 carried by the frame of the instrument and which engages the centre of the diaphragm. An abutment 13 is formed on the upper limb of the U and engages a lever arm 14 on a rockshaft 15 mounted in two bearings carried by supports 16 secured to the frame of the instrument. The lever arm is counterbalanced by another arm 17 (see Figure 2) on the opposite side of the rockshaft and carrying a suitable counterpoise weight 18. The first lever arm is maintained in contact with the abutment by a U- shaped spring 19 having its ends connected to said lever arm and to the centre of the capsule respectively. A third lever arm 20 is secured to said rockshaft and extends upwardly and has a small spherical ball 21 secured to its upper end. The lever arm 14 is secured by a setscrew 22 to a block 23 having a bore therein through which the rockshaft extends and is adjustably secured by a setscrew 24. The pointer 25 of the instrument is geared through wheels 26 and 27 to a cylindrical driven member 28 rotatably mounted on the underside of the wheel 27 with its axis eccentric to the gearwheel, which gearwheel constitutes the aforesaid rotating element. The axes of rotation of the gearing and the cylindrical driven member are disposed transversely to the face of the capsule and to the rockshaft. The pointer 25 is arranged to traverse a suitable scale 29 and a helical spring 30 is arranged to rotate a spindle 31 of the pointer in such a direction that the cylindrical driven element is maintained in contact with the aforesaid spherical ball. Similarly, the U-shaped spring 19 between the first said lever arm 14 and the capsule 10 fulfils that function. The cylindrical driven member 28 is so located on the gearwheel 27 that when the pointer is at the zero end of the scale, there is a comparatively small angle between a line drawn from the centre of the gearwheel 27 to the centre of the cylindrical member and a line drawn from the centre of the gearwheel 27 to the centre of the ball 21. With this arrangement, the initial arcuate movement of the ball will cause a greater angular movement of the rotating element than for later stages of movement of the ball when its direction of movement will approach tangential to the cylinder. The following dimensions are found to be suitable for an instrument in which the pointer 25 moves through an angle of about 650° for a range of speeds up to 560 M. P. H. and for a movement of 0.1 inch of the capsule over that range. The distance of the point of contact between the abutment 13 and the first said lever arm 14 from the axis of the rockshaft 15 is approximately 0.18 inch. The length of the third lever arm to the centre of the spherical ball is 0.6 inch. The diameters of the spherical ball 21 and cylindrical driven member 28 are 0.125 inch and 0.195 inch respectively. The distance of the axis of rotation of the cylindrical driven element from the centre of the gearwheel 27 is 0.2 inch. The angle between the line joining the centre of the gearwheel 27 to the centre of the cylinder 28 and from the centre of the gearwheel 27 to the centre of the ball, when the pointer is at zero, is 0° and the gear ratio between the pointer and the rotating element is 6.5:1.

The gearwheel 27 is prevented from passing dead centre position by a stop 33 arranged in the path of movement of an abutment 32 on the gearwheel, otherwise without this stop the cylindrical member could move past dead centre out of contact with the ball.

It will be appreciated that many modifications may be made to the above construction without departing from the scope of the invention. For example, both the cylinder 28 and the ball 21 may be mounted to rotate bodily or the ball could be rotatable and the cylinder fixed against rotation about its axis. So long as the rotatable member has a surface of revolution, the other one need not have such a surface. The member 28, instead of being cylindrical might be conical, as shown in Figure 3, according to the characteristics of the response of the diaphragm and if the cone is rotatably mounted the ball might be replaced by a non-circular member 34 having a curved surface.

I claim:

1. A measuring instrument having a transmission comprising a rotating element, a pointer operated thereby, a driven member mounted on said rotating element at a distance from its axis of rotation and having a convex outer surface, a driving member engaging said driven member, a mounting for said driving member arranged to constrain it to rotate about an axis transverse to the first said axis so that a part thereof moves towards and away from the axis of rotation of the driven member, at least one of which members is mounted to rotate bodily and the contacting faces of which members are so shaped to provide a required varying speed ratio between the members over the required range of movement.

2. A measuring instrument having a transmission comprising a rotating element, a pointer operated thereby, a driven member rotatably mounted on said rotating element at a distance from the axis of rotation of said element and having a surface of revolution coaxial with its own axis of rotation, a driving member engaging said driven member, a mounting for said driving member arranged to constrain it to rotate about an axis transverse to the first said axis so that a part thereof moves towards and away from the axis of rotation of the driven member, which driving member is fixed against movement other than the driving movement and is provided with a curved face.

3. A measuring instrument having a transmission comprising a rotating element, a pointer operated thereby, a driven member rotatably mounted on said rotating element at a distance from the axis of rotation of said element and having a surface of revolution coaxial with its own axis of rotation, a driving member rotatably mounted on an arm and having a surface of revolution engaging said driven member, a mounting for said driving member including said arm and arranged to constrain it to move in a direction transverse to the circumferential path of movement of the driven member, the contacting faces of which members are so shaped and the direction of movement of the driven member so selected that the required varying speed ratio between the members is effected over a required range of movement.

4. A measuring instrument having a transmission comprising a rotating element, a pointer operated thereby, a driven member mounted on said rotating element at a distance from its axis of rotation and having a convex outer surface, a driving member engaging said driven member, a mounting for said driving member arranged to constrain it to move in an arcuate path about an axis transverse to the first said axis towards and away from the axis of rotation of the rotating element, at least one of which members is mounted to rotate bodily and the contour of which driven member varies as it extends away from the rotating element.

5. A measuring instrument having a transmission comprising a rotating element, a pointer operated thereby, a driven member mounted on said rotating element at a distance from its axis of rotation, a driving member engaging said driven member, the mounting for said driving member arranged to constrain it to move in an arcuate path in a plane transverse to the plane of rotation of the rotating element, at least one of which members is mounted to rotate bodily and the contour of which driven member comprises a cylinder.

6. A measuring instrument having a transmission comprising a rotating element, a pointer driven by said element, a cylindrical driven member rotatably mounted on said rotating element with its axis at a distance from the axis of the rotating element, a spherical member engaging said driven member, a mounting for said spherical member and arranged to constrain it to move in an arcuate path in a plane transverse to the plane of rotation of the cylinder.

7. An air-speed indicator having an element adapted to move in response to variations in air speed and a transmission comprising a gearwheel meshing with a pinion carrying a pointer, a cylindrical driven member rotatably mounted on a face of the gearwheel with its axis disposed at a distance from the axis of rotation of the gearwheel, a spherical driving member engaging said cylinder, a rockshaft having an arm carrying said spherical member and another arm on said rockshaft connected with the responsive element of the instrument.

WILFRED OWEN DAVIS.

REFERENCES CITED

The following references are of record in the file of this patent:

UNITED STATES PATENTS

| Number | Name | Date |
|---|---|---|
| 1,351,130 | Roesch | Aug. 31, 1920 |
| 1,700,449 | Reilly | Jan. 29, 1929 |
| 1,489,463 | Sherrin | Apr. 8, 1924 |
| 1,891,134 | Barthel | Dec. 13, 1932 |
| 2,000,308 | Von Schutz | May 7, 1935 |
| 2,137,194 | Weber | Nov. 15, 1938 |